United States Patent
Erickson et al.

(10) Patent No.: US 6,807,596 B2
(45) Date of Patent: Oct. 19, 2004

(54) SYSTEM FOR REMOVING AND REPLACING CORE I/O HARDWARE IN AN OPERATIONAL COMPUTER SYSTEM

(75) Inventors: Michael John Erickson, Loveland, CO (US); Daniel V. Zilavy, Ft. Collins, CO (US); Bradley D. Winick, Fort Collins, CO (US); Paul J. Mantey, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 09/916,752

(22) Filed: Jul. 26, 2001

(65) Prior Publication Data

US 2003/0023801 A1 Jan. 30, 2003

(51) Int. Cl.[7] .......................... G06F 13/00; G06F 11/00
(52) U.S. Cl. ........................ 710/301; 710/302; 710/10; 710/16; 714/5; 714/43; 714/44
(58) Field of Search ................................ 710/8, 10, 16, 710/17, 301, 302; 714/4, 5, 7, 43, 44; 713/300

(56) References Cited

U.S. PATENT DOCUMENTS

| | | | | |
|---|---|---|---|---|
| 5,596,569 A | * | 1/1997 | Madonna et al. | 714/43 |
| 5,815,647 A | * | 9/1998 | Buckland et al. | 710/302 |
| 5,838,929 A | * | 11/1998 | Tanikawa | 710/302 |
| 5,875,310 A | * | 2/1999 | Buckland et al. | 710/309 |
| 6,243,773 B1 | * | 6/2001 | Mahalingam | 710/302 |
| 6,684,343 B1 | * | 1/2004 | Bouchier et al. | 714/4 |

* cited by examiner

*Primary Examiner*—Glenn A. Auve

(57) ABSTRACT

A system for removal and replacement of core I/O devices while the rest of the computer system is powered-up and operational. The system comprises a custom form-factor core I/O card that contains a plurality of I/O devices, including a processor for managing the card's I/O functions. A command is sent to an operating system, running on a system processor external to the core I/O card, that notifies the system to stop using, and de-configure, the hardware on the core I/O card. Once the OS receives this notification, an indication that the card is ready to be removed is sent to the user. The user then removes the card from its slot and inserts a replacement card into the same slot. The system software then discovers the I/O components on the core I/O card to determine what components are available, and then configures the new I/O device(s).

20 Claims, 4 Drawing Sheets

SYSTEM FOR REMOVING AND REPLACING CORE I/O HARDWARE IN AN OPERATIONAL COMPUTER SYSTEM

BACKGROUND OF THE INVENTION

Field Of The Invention

The present invention relates generally to computer systems, and more particularly, to a subsystem that provides for removal and replacement of core I/O devices while the rest of the computer system is powered-up and operational.

Statement of the Problem

Many computer products supply a minimal set of built-in I/O devices, often called 'core I/O'. These core I/O devices include I/O controllers for peripheral devices, bus management, and the like. In low-end systems these devices are located on the main system board. In high-end systems the core I/O devices are often located on a separate board that cannot be removed unless the system is shut down, i.e., the core I/O cannot be 'hot-swapped'. Therefore, system downtime is incurred when a core I/O device is replaced in the case of a hardware failure or upgrade. Previously existing methods for providing core I/O generally fall into three categories:

(a) Core I/O functionality is built into the system (main) board;

(b) Core I/O is built into a card, separate from the main board, that is not hot-swappable, i.e., that cannot be replaced without shutting down (and thus rendering inoperable) the entire system; or (c) Core I/O is built into a card compatible with a PCI (Peripheral Computer Interface) slot.

In the case of (a), above, where the core I/O is built into the main board, the system must be shut down and the system board removed in order to replace or modify the particular I/O devices of interest. This configuration can be costly when only I/O hardware needs to be replaced or upgraded.

When core I/O is located on a separate card that is not hot-swappable, as in (b), above, the I/O device(s) of interest can be replaced or upgraded without replacing the rest of the system board(s). However, the system must be brought down completely, thus decreasing system uptime and availability.

If core I/O is built into a PCI slot-compatible card, advantage can be taken of PCI's specified hot-plug capabilities as described in the PCI specification, but connectivity to the rest of the system is severely constrained by card size and pin limitations. Furthermore, existing PCI cards accommodate only one device per card, which further limits the functionality of a core I/O card.

For higher-end computer systems, shutting down the system for maintenance is very costly, which is why emphasis is put on system 'up-time' and 'high-availability'. What is needed is a system that allows for core I/O removal, addition, and replacement while the system remains operational. In addition, there is a need for flexibility in designing the core I/O card interface to the rest of the system.

3. Solution to the Problem

The present system solves the above problems and achieves an advance on the field by providing a mechanism for removing and installing I/O core hardware while a computer system is operating. Costly downtime usually associated with the replacement of I/O hardware is thus eliminated. Expansion of a system's capabilities is thus greatly facilitated. For example, if a computer system has one or more available (unused) core I/O slots, additional I/O hardware can be added without incurring additional system down-time. In addition, existing hardware can be upgraded, or failed hardware can be replaced without incurring any additional system down-time.

The system comprises a custom form-factor core I/O card that contains a plurality of I/O devices, including a processor for managing the card's I/O functions. In addition, the present system allows a core I/O board to have any desired type of interface to the computer system, including a common form such as a PCI slot, or alternatively, a completely custom interface. A custom interface is often necessary when the core I/O contains other functionality such as system management functions that require a unique set of signals to be transmitted between the I/O card and the computer system. Furthermore, the present system does not require that the power to the card slot be turned off when the card is inserted or removed.

In operation, a command is sent to an operating system (OS), running on a system processor, that notifies the system to stop using, and de-configure, the hardware on the core I/O card. This command can be initiated by a pushbutton, a software routine, or by some other method. Once the OS receives this notification, it quiesces the drivers, halts bus traffic, and may power down the slot. Then an indication that the card is ready to be removed is sent to the user. This indication may be provided by an LED, a software alert, or by some other mechanism.

The user then removes the card from its slot and inserts a replacement card into the same slot. Current limiters on the system side prevent spikes on the supply voltage rails from occurring when a card is first inserted into a slot and powered up. Once the card is powered up (if previously powered down), the system software can query the I/O components on the core I/O card to determine what components are available, and then configure the new I/O device(s).

The system core I/O may thus be switched without consuming costly downtime. The method of the present system is especially useful in systems having multiple core I/O boards and multiple OS instances or partitions. In systems having multiple partitions (or operating systems), an I/O board in one partition may be replaced while the remaining partitions (or operating systems) remain operational. In addition, the present system allows the core I/O card to be located either in an existing I/O slot such as a standard PCI slot, or in a custom slot specifically designed for a particular core I/O board. Using a custom slot allows greater flexibility in both system interconnect and in the mechanical design thereof.

DETAILED DESCRIPTION OF THE PREFERRED EMBODIMENTS

Figure 1:
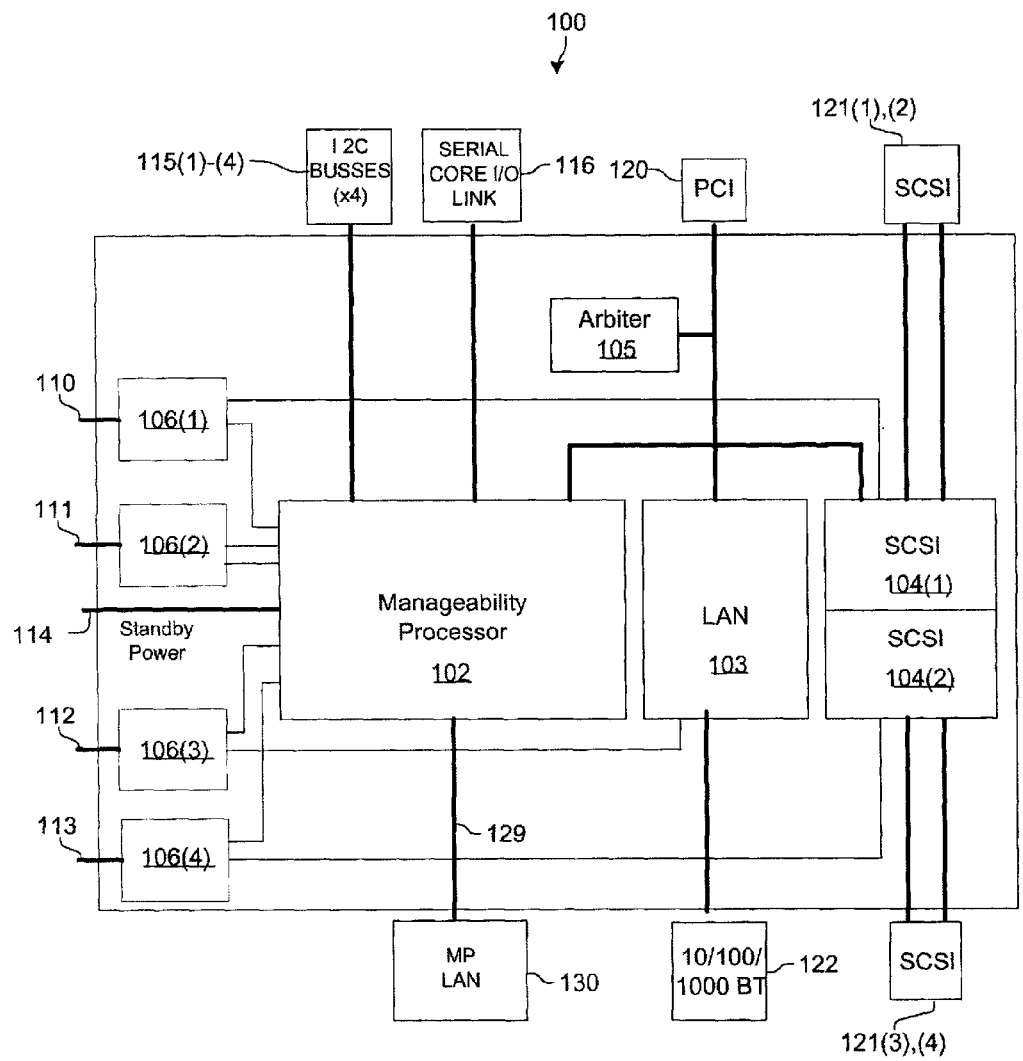
FIG. 1 is a block diagram illustrating exemplary components utilized in a core I/O card in accordance with the present system.

FIG. 1 is a block diagram illustrating exemplary components utilized in a core I/O card 100 in accordance with the present system. In the exemplary configuration shown in FIG. 1, core I/O card 100 comprises four devices including a manageability processor 102 and three I/O devices, which include LAN controller 103 and two SCSI bus controllers 104(1)/104(2). In addition, in the present exemplary embodiment, card 100 also includes four power controllers 106(1)–(4) and PCI bus arbiter 105. Each power controller 106* is connected to a separate power rail (not shown) and provides power for the devices on the card 100. Note that where there is a plurality of similar devices, a single one of the devices is hereinafter denoted by a reference number followed by a wild card symbol; e.g., core I/O card 100* represents either one of the cards 100A or 100B; and the plurality of similar devices is simply denoted by the reference number only.

Each power input 110–113 to the respective power controller may supply a different voltage, which thus enables card 100 to accommodate various different types of devices. Power controllers 106 turn power on or off to each of the associated devices (e.g., 401–403, shown in FIG. 4) in response to a signal from OS 211 (shown in FIG. 2) or in response to a signal from MP 102, which received a signal from the OS. Manageability processor 102 receives power from an uninterruptable power source, supplied via input 114.

A plurality of communication buses are connected to manageability processor 102, including four I2C buses 115(1)–(4), a serial I/O link 116 coupled to another core I/O card 100* in the system, a LAN connection to a network (not shown), and a PCI bus120, which is also connected to LAN controller 103 and SCSI controllers 104(1)/104(2). Additional communication buses connected to other devices on card 100 include a 10/100/1000 BT (122), and four SCSI buses 121(1)–(4) connected to SCSI controllers 104(1)/104 (2).

Figure 2:
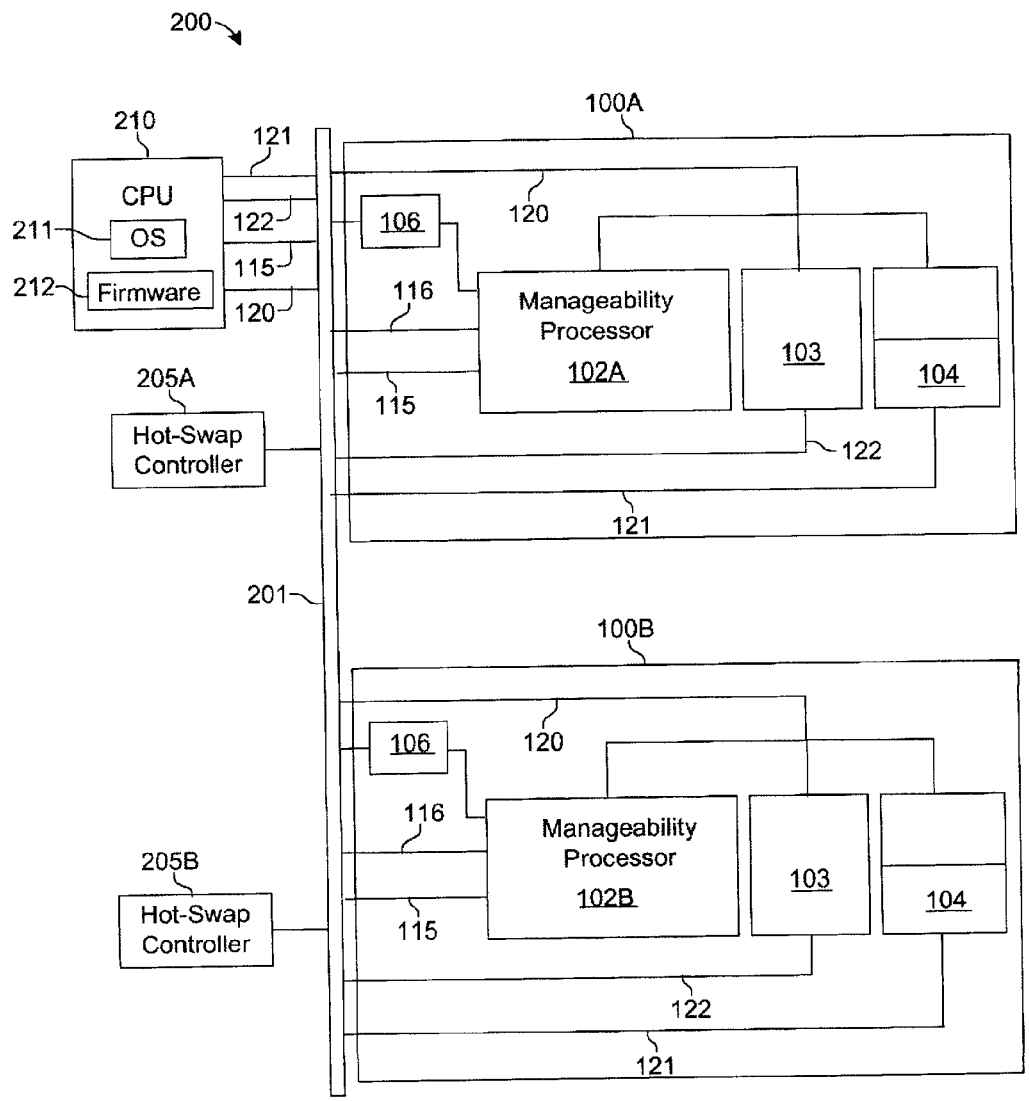
FIG. 2 is a block diagram illustrating two core I/O cards in an exemplary system environment.

Manageability processor 102 monitors and supervises several basic functions of the system 100, and runs independently of the system processor 210 (shown in FIG. 2). These basic functions include functions such as temperature monitoring, and optionally, control of power to each device on card 100* via power controllers 106.

In an exemplary embodiment of the present system, OS 211 sees manageability processor 102 as a UART (universal asynchronous receiver/transmitter) that it can use for a console. The manageability processor can then redirect the console data, for example, over a LAN via bus 122.

FIG. 2 is a block diagram illustrating two core I/O cards 100A and 100B in an exemplary system environment 200. Each card, 100A and 100B, is identical to I/O core card 100 shown in FIG. 1, with certain elements thereon being omitted for clarity. As shown in FIG. 2, system 200 includes two identical I/O core cards 100A and 100B. I/O core card 100B is used as a backup for card 100A while card 100A is being swapped, as explained in detail below. Cards 100A and 100B communicate via an I2C link 115* or serial link 116. Manageability processors 102A and 102B, on cards 100A and 100B, respectively, are each coupled to system processor 210 via PCI bus 120. Manageability processors 102 intercommunicate via serial link 116. System processor 210 includes OS (operating system) 211 and firmware 212, which provides low-level system I/O functionality similar to a BIOS used in personal computer systems. Firmware 212 finds and maps new hardware devices in system 200 (see step 335 in FIG. 3, described below).

Backplane 201 is used for routing the various buses (described above) between cards 100A/100B and the system peripheral devices (not shown). Controllers 205A and 205B function as current limiters to prevent power spikes when cards 100 are inserted and removed. In an exemplary embodiment, controllers 205A and 205B also turn off power to cards 100A and 100B, respectively, before either of the cards is removed. The appropriate controller turns the power back on after the card 100* is (re)inserted.

Figure 3:
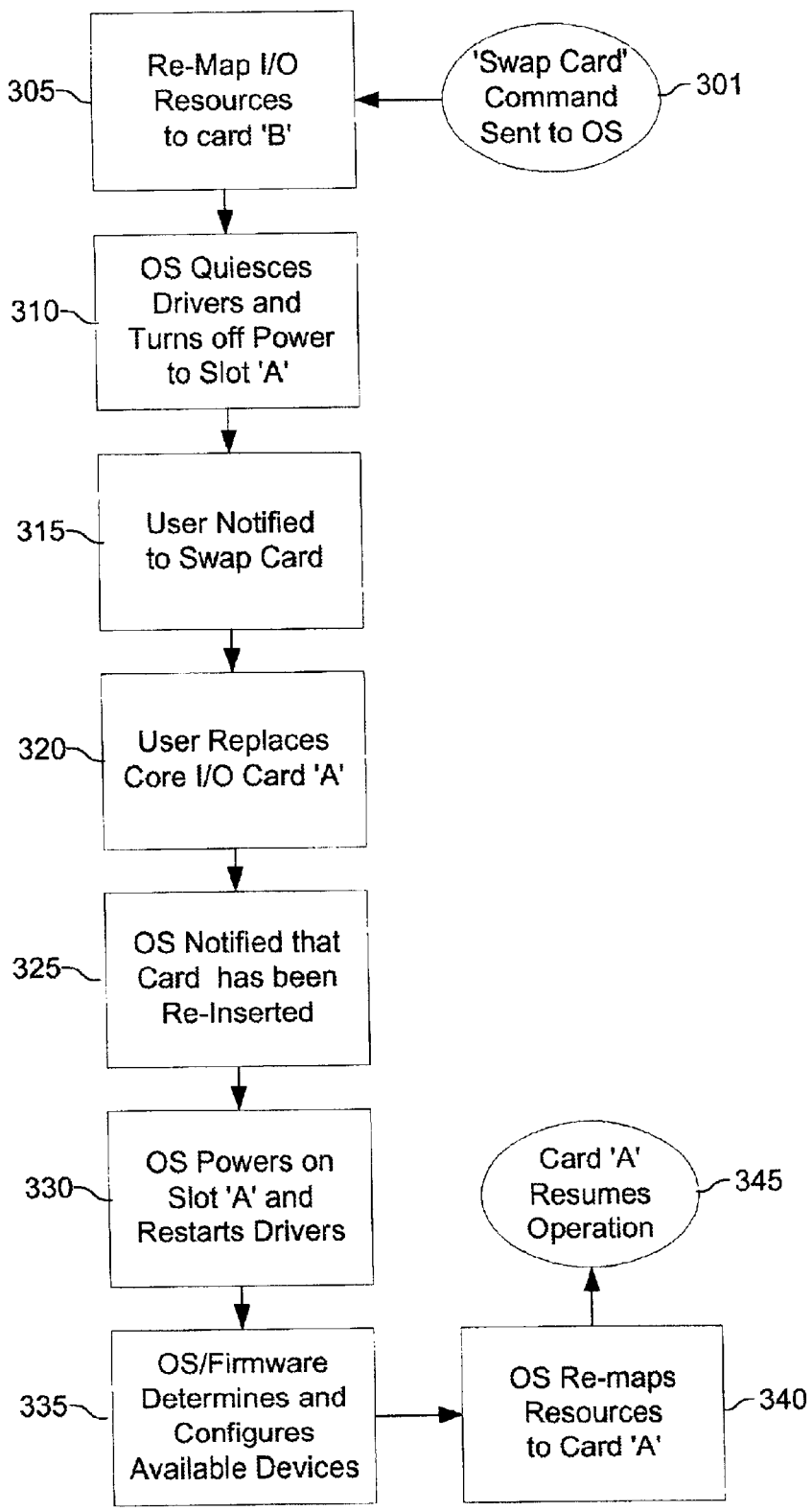
FIG. 3 is a flowchart showing an exemplary sequence of steps performed in practicing a method in accordance with the present system.

FIG. 3 is a flowchart showing an exemplary sequence of steps performed in practicing a method in accordance with the present system. As shown in FIG. 3, at step 301, a 'swap core I/O card' command, indicating that core I/O card 100A is to be replaced, is sent to the OS 211 running on system processor 210. This command can be generated by a pushbutton, a software routine, or by some other method. For example, either a software utility running under OS 211, or a system user may discover that the card is not operating properly, and initiate the appropriate notification.

At step 305, the OS 211 in system processor 210 At step 310, OS 210 re-maps the appropriate resources from core I/O card 100A to core I/O card 100B. The resources are remapped before shutting down card 100A so that applications using the resources are minimally affected. At step 310, the OS 211 stops using, and de-configures the hardware on core I/O card 100A. OS 211 then quiesces all I/O drivers for card 100A. OS 211 then optionally turns off power to the slot for card 100A by notifying power controllers 106 on card 100A to power down each of the associated devices 102–104.

At step 315, OS 211 generates an indication to the user that card 100A is ready to be removed. This indication may be provided by an LED, a software-generated alert, such as a message on a video display, or by some other mechanism. The user then removes card 100A from its slot, and inserts a replacement card (hereinafter also referred to as card 100A) into the same slot, at step 320. Current limiters in controllers 205A and 205B prevent spikes on the supply voltage rails from occurring on when the card is inserted into its slot and powered up. Note that the slot for card 100A may remain powered up during the above process, in which case, the slot does not need to be powered up again in step 330, below. During the interim period between the time core I/O card 100A is removed and re-inserted in its card slot, system processor 210 remains operational and card 100B performs all of the core I/O functions that were previously being performed by card 100A.

At step 325, OS 210 is notified that card 100A has been re-inserted. In an exemplary embodiment of the present system, this notification is provided by a 'card present' signal generated by circuitry on card 100A. Alternatively, a user may provide notification to OS 211 via a switch or input from a keyboard. In response to this notification, at step 330, OS 211 turns on power to the slot for card 100A (in the situation wherein the power was turned off in step 310). Once card 100A is powered up, the I/O drivers for the card are re-started.

At step 335, OS 211 then causes firmware 212 to query the devices on card 100A to determine what devices are available, and then configures the new I/O devices. At step 340, OS 211 re-maps the appropriate resources to card 100A, which then resumes operation in place of core I/O card 100B, at step 345.

Because the system processor 210 continues to run during the above-described card swap process, the system core I/O may thus be switched without consuming costly downtime. The present method is especially useful in systems having multiple core I/O boards and multiple OS instances or partitions. In systems having multiple partitions (or operating systems), an I/O board in one partition may be replaced while the remaining partitions (or operating systems) remain operational.

Figure 4:
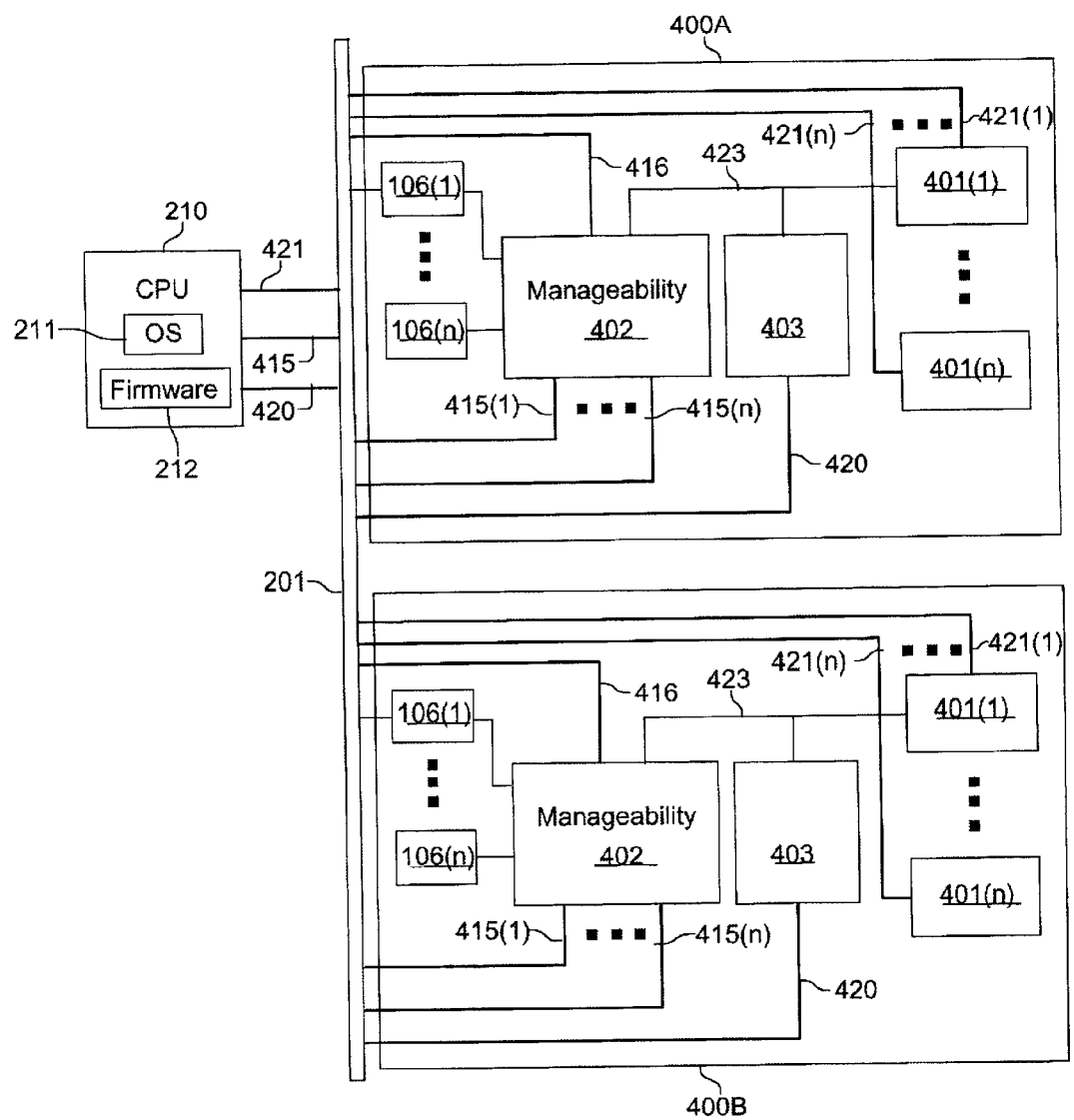
FIG. 4 is a block diagram illustrating an alternative embodiment of the present system.

FIG. 4 is a block diagram illustrating an alternative embodiment of the present system. Core I/O cards 400, like cards 100 described previously, do not have the pin limitations of a PCI card, and the dimensions of the core I/O cards 400 are not limited to those of a standard PCI card.

The core I/O card of the present system is not limited to inclusion of the specific devices shown in FIGS. 1 and 2. As shown in FIG. 4, identical core I/O cards 400A and 400B each comprise manageability firmware 402, an optional network controller 403, a plurality of power controllers 106, an optional plurality of communication buses 421, an optional bus 420 specifically for communication between manageability firmware 402 and system processor 210, and a plurality of I/O devices 401. Manageability firmware 402 on cards 400A and 400B, if present, intercommunicates via an I2C link 415* or serial link 416. Each power controller 106* is connected to a different one of the I/O devices 401 (via lines not shown for the sake of clarity), and to network controller 403 (also considered to be a 'device'), if present. Each power controller is connected to system processor O/S 211 for controlling the power to the respective device on card 400* via communication with manageability firmware 402.

Manageability firmware 402A and 402B, on cards 400A and 400B, respectively, is coupled to system processor 210 via PCI bus 420. If network controller 403 and corresponding bus 420 are not present, then communication between manageability firmware 402 and system processor 210 may take place via one of the buses 421*.

In an exemplary embodiment of the present system, manageability firmware 402 monitors and supervises basic functions of card 100, and runs independently of system processor 210.

Manageability firmware 402 may, alternatively, comprise a processor that executes the core I/O management software appropriate for the devices 401 and 403 on the card 400*. Lines 415 may be I2C buses or other serial buses, lines 421 may be SCSI or other parallel buses, and may alternatively include one or more serial buses, lines 420 and 423 may be a PCI bus, or other bus suitable for communication between manageability firmware 402, system processor, and devices 401/403.

While preferred embodiments of the present invention have been shown in the drawings and described above, it will be apparent to one skilled in the art that various embodiments of the present invention are possible. For example, the specific configuration of the core I/O cards described above, as well as the particular sequence of steps shown in FIG. 3, should not be construed as limited to the specific embodiments described herein. Modification may be made to these and other specific elements of the invention without departing from its spirit and scope as expressed in the following claims

We claim:

1. A system for removing and replacing core I/O hardware in an operational computer comprising a system processor, the system comprising:

a first core I/O card and a second core I/O card, wherein each said card comprises a plurality of I/O devices providing core I/O functions associated with the system processor;

wherein at least one of the I/O devices on each said card installed in the computer is coupled to the system processor via a communication bus; and wherein, in response to signals sent from the system processor via the communication bus indicating failure of the first I/O card, the second core I/O card performs functions performed by the first I/O card while the first I/O card is removed from its card slot and replaced.

2. The system of claim 1, including a plurality of power controllers on each said card;

wherein each one of the devices on each said card is connected to a separate one of the power controllers;

wherein each one of the power controllers turns power off to a respective one of the I/O devices on the first core I/O card in response to a signal from the system processor indicating that the first I/O card is to be removed from said slot; and wherein each one of the power controllers turns power on to a respective one of the I/O devices on the first core I/O card in response to a signal from the system processor indicating that the first I/O card has been replaced in said slot.

3. The system of claim 2, including a manageability processor on each said card, wherein the manageability processor functions as a UART console to redirect data received from the system processor via a communication bus.

4. The system of claim 2, wherein the system processor quiesces all I/O drivers associated with the first core I/O card prior to notifying the power controllers on said first core I/O card to power down the devices on said first care I/O card.

5. The system of claim 1, including means for notifying a user of the system that the first core I/O card has been powered down.

6. The system of claim 1, wherein the system processor continues to operate while the first I/O card is removed from its card slot and replaced.

7. The system of claim 1, wherein each said card includes a plurality of communication buses coupled between at least one of the devices on said card and the system processor.

8. The system of claim 7, wherein at least one of the communication buses is a PCI bus and at least one of the buses is a non-PCI bus.

9. The system of claim 1, wherein one of the devices on each said card is a LAN controller and another one of the devices is a SCSI bus controller.

10. A care I/O card for handling core I/O functions associated with a system processor, the card comprising:

a plurality of I/O devices; and a plurality of power controllers;

wherein each one of the devices on the card is connected to a separate one of the power controllers; and wherein at least one of the devices on the card is coupled, via a communication bus, to the system processor.

11. The core I/O card of claim 10, wherein:

each one of the power controllers turns power off to a respective one of the I/O devices on the core I/O card in response to a signal from the system processor indicating that the I/O card is to be removed from its slot; and each one of the power controllers turns power on to a respective one of the I/O devices on the core I/O card in response to a signal from the system processor indicating that the I/O card has been replaced in said slot.

12. The core I/O card of claim 11, further comprising a manageability processor which functions as a UART console to redirect data received from the system processor via a communication bus.

13. The core I/O card of claim 10, further comprising a plurality of communication buses coupled between at least one of the I/O devices on said card and the system processor.

14. The core I/O card of claim 13, wherein at least one of the communication buses is a PCI bus and at least one of the buses is a non-PCI bus.

15. The system of claim 10, wherein one of the devices on each said card is a LAN controller and another one of the devices is a SCSI bus controller.

16. A method for removing and replacing core I/O hardware in a computer system while the computer system remains operational, wherein the computer system includes an operating system running on a system processor, the method comprising the steps of:

(a) notifying the operating system that the core I/O hardware on a first core I/O card is to be replaced;

(b) re-mapping I/O resources used by the system processor to a second core I/O card having said core I/O hardware identical in function to that of the first core I/O card;

(c) quiescing all I/O drivers on the first core I/O card;

(d) notifying the operating system when the first core I/O card has been replaced;

(e) re-starting the I/O drivers on the first core I/O card; and (f) re-mapping the appropriate resources to the first core I/O card.

17. The method of claim 16, wherein a user of the computer system is notified when the first core I/O card is ready to be removed.

18. The method of claim 16, including the additional steps of: turning off power to first core I/O card between steps (c) and (d), and turning on power to first core I/O card between steps (d) and (e).

19. The method of claim 16, wherein steps (b), (c), (e) and (f) are initiated by the operating system.

20. The method of claim 16, wherein said core I/O hardware comprises a plurality of I/O devices on a single core I/O card.

* * * * *